United States Patent
Samsel

[11] Patent Number: 5,810,194
[45] Date of Patent: Sep. 22, 1998

[54] COLLAPSIBLE BOWL-LIKE CONTAINER

[76] Inventor: Christine A. Samsel, 423 N. Irving Blvd., Los Angeles, Calif. 90009

[21] Appl. No.: 734,077

[22] Filed: Oct. 21, 1996

[51] Int. Cl.$^6$ .................................................. A47G 19/02
[52] U.S. Cl. ........................................... 220/574; 220/641
[58] Field of Search .................................. 206/223, 494, 206/525, 541, 546, 548; 220/574, 574.1, 575, 640–645, 408; 383/75

[56] References Cited

U.S. PATENT DOCUMENTS

| | | | |
|---|---|---|---|
| 1,627,051 | 5/1927 | Moore | 220/574 |
| 2,676,729 | 4/1954 | Neville, Jr. et al. | 220/644 |
| 4,139,115 | 2/1979 | Robinson | 220/644 |
| 4,828,134 | 5/1989 | Ferlanti | 220/408 |
| 5,024,262 | 6/1991 | Huang | 160/370.2 |
| 5,232,118 | 8/1993 | Samuel | 383/75 |

FOREIGN PATENT DOCUMENTS 468893  1/1992  European Pat. Off. ............... 220/574

Primary Examiner—Jimmy G. Foster
Attorney, Agent, or Firm—Beehler & Pavitt

[57] ABSTRACT

A portable collapsible vessel for holding a fluid or other substance formed of a rigid but flexible thin loop through and over which is passed the edge of sheet material formed to define a cavity terminating in a mouth defined by said edge area. Said edge area is passed through the loop and is doubled-back to contact the outside wall of such material, where it is secured by heat sealing or adhesive. When the loop with the sheet material so secured is twisted to bring one part of the loop into abutment with the other part, the sheet material collapses so that, while it may no longer serve as a vessel, it occupies a minimum of storage space. The sheet material may either be permanently secured over the loop or it may be peelably adhered to the outside wall of the vessel for removal from the loop and replacement.

9 Claims, 1 Drawing Sheet

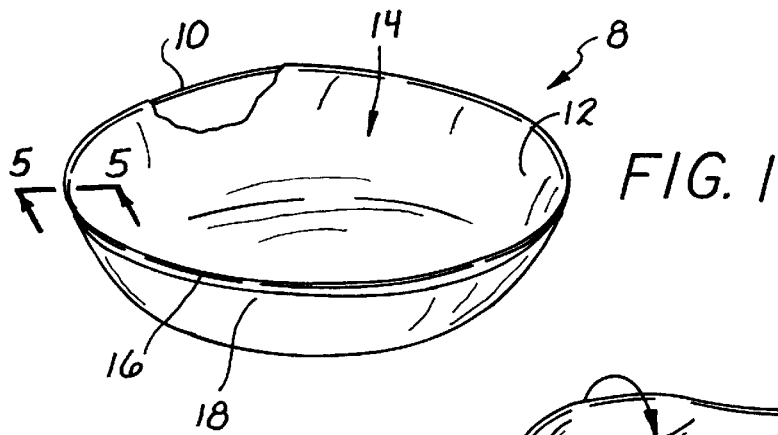
FIG. 1
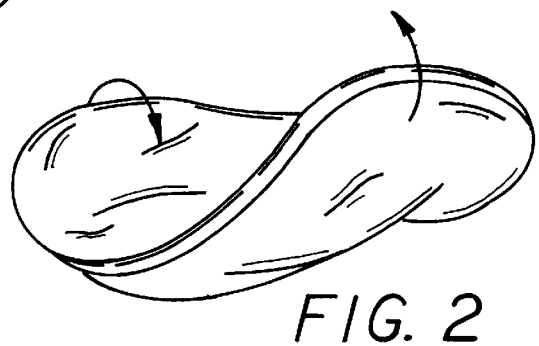
FIG. 2
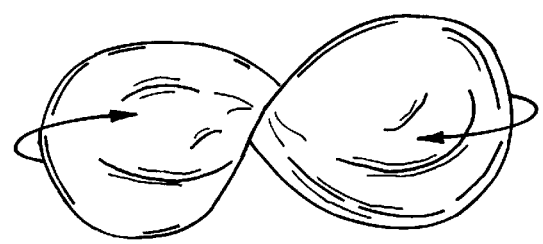
FIG. 3
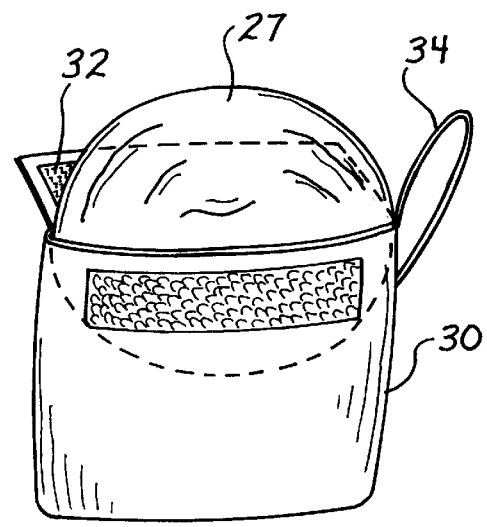
FIG. 4
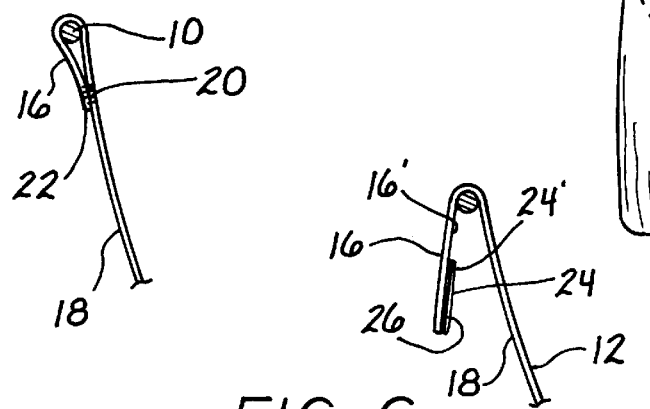
FIG. 5
FIG. 6

COLLAPSIBLE BOWL-LIKE CONTAINER

FIELD OF THE INVENTION

This invention relates generally to the field of bowl-type receptacles or containers and, particularly, to collapsible containers.

BACKGROUND OF THE INVENTION

Bowl-like containers are customarily made with a rigid wall which defines the bowl cavity. Since such wall is ordinarily continuous, and not collapsible, if a bowl is to be taken anywhere, such as on a trip or camping, it will always occupy the same amount of space. Where space is at a premium, such as in a car or camper or backpack, only small bowls or cups may ordinarily be carried. Such small bowls will often be found to be inadequate for many types of uses, such as where the bowl is to receive solids, such as pet food, water, milk, soup or other liquids and to hold them without leakage.

Some efforts have been made to provide bowl-like containers with walls which may be pulled apart into sections, or may be telescoping, but such bowls will usually be found to leak the liquid contained in them, and keeping and assembling the sections properly can be quite inconvenient. Bowls several sizes bigger than a cup may be needed on camping trips or picnics, and particularly when one may be traveling with one or more dogs or other pets. Periodically, when traveling with pets, it is desirable and/or necessary to stop at least every couple of hours to permit the pet to be walked and, at the same time, to provide the pet with water or food. While a bottle of water may conveniently be carried, or water can be procured from fountains at road rest stops or gas stations, it is usually a problem getting water from a fountain or spigot into a suitable small container where a dog or other pet may effectively drink it.

On camping trips, it may be desired to eat some type of cereal, such as instant oat meal, or to prepare a soup. While water may be boiled for mixing with the cereal, unless an unusually large cup or cereal bowl is carried in the back pack, it may be found difficult to provide the right proportion of water and cereal in the average size drinking cup. If an effort is made to prepare at least two or three cups of cereal, this is an inconvenience because it means preparing cereal several times. Where the ingredients of a packaged cereal, soup, or other dehydrated food are not homogeneously distributed in the package, when an effort is made to prepare a dehydrated food separately through the use of several small cups, by adding hot water to each different installment, the result may often be found to be quite unsatisfactory. Cleaning after use may also present a problem.

What has been, and is needed, is some type of a bowl-like receptacle which can be conveniently collapsed into occupying a very small space but, when opened up, can result in a bowl cavity which can hold at least a pint of liquid if not more, and without permitting leakage.

It is also desirable to provide a container with walls which may be either easily cleaned after bowl use, or altogether replaceable at a minimum of expense.

SUMMARY OF THE INVENTION

The present invention employs a flexible loop of the type disclosed in U.S. Pat. No. 4,815,784, but instead of utilizing the loop to support a planar surface, particularly in conjunction with a second loop, as taught in the last mentioned patent, the loop is fitted with an impervious flexible sheet or material, such as a plastic material. This material should be formed in such a manner as to define a dome portion of a sphere, or a cylinder with a closed end, preferably a circular mouth of a diameter slightly larger than the diameter of the loop when opened. When the thus-formed sheet is fully extended to its uncollapsed state, the mouth of the sheet material is extended over the loop and back to itself where it may be secured, as by adhesive, or by heat sealing (if the material is thermoplastic). Alternatively, the joined material could be secured, as by sewing.

In the preferred embodiment of the invention, the adhesive used to secure the edges of the sheet over the loop and back upon the outer wall of the sheet may be of the type which will permit the edge to be peeled away from the sheet wall. Thereby, the sheet may be removed from the loop and replaced with a new clean sheet.

It may be seen thus that when the loop is in its normal opened condition, it may support the sheet in its open configuration and defines the mouth of the cylinder, dome or partial sphere to form a bowl or other receptacle. However, if the flexible loop should be twisted into its smaller configuration, the sheet itself will follow the twist so that the combination of the loop and sheet will occupy but a fraction of the total volume of the receptacle when the loop is opened fully and the sheet extended from its loop held mouth. It may be seen, then, that a fair sized bowl-like or other receptacle may be provided to receive liquid, and after use may be compacted to such a smaller size that it may be inserted in a coat pocket.

Because of the tendency of the flexible loop to spring back into its untwisted condition, if it should be desired to keep or store the bowl in its reduced size, it will be necessary to provide some type of close fitting container to house the twisted bowl. While this could be accomplished by inserting the twisted bowl in a garment or knapsack pocket, it may be desirable to provide a separate fabric or plastic pouch into which the twisted bowl may be inserted and retained in its reduced size condition. The mouth of such a pouch could be secured by snaps or VELCRO strips, with or without a hanging loop or clip.

DESCRIPTION OF THE DRAWINGS

In the accompanying drawings:

FIG. 1 is a perspective view of a fully extended bowl partly broken away;

FIG. 2 illustrates the first step in compacting the bowl; and

FIG. 3 illustrates the initial effect of twisting of the bowl;

FIG. 4 is a perspective view of a pouch showing partially inserted therein the bowl after completion of the twisting action of FIGS. 2 and 3.

FIG. 5 is a section taken on the line 5—5 of FIG. 1;

FIG. 6 is a section similar to FIG. 5 but showing use of a different type of adhesive.

DESCRIPTION OF THE PREFERRED EMBODIMENT

Referring to FIG. 1 of the drawings, a bowl 8 is formed by attaching to a flexible circular loop 10, a crushable sheet of water proof material 12, such as nylon fabric, polyethylene or other flexible but liquid-impervious plastic sheeting. Desirably, the sheeting material 12 should be formed in a dome or partial spherical configuration to present a circular mouth 14 having a diameter sufficiently greater than the outside diameter of the loop 10 to enable the edge 16 of the circular mouth 14 to be passed over the flexible loop 10 and brought back to be secured adjacent the loop 10 against the outer wall 18 of the sheet material 12. If the material 12 is a thermoplastic, the edge 16 could be heat sealed to the outer wall 18. Alternatively, it could also be permanently secured to the outer wall 18 at the time the bowl 8 is manufactured, by applying an adhesive 20 to the edge 16, or around the outer wall 18 along the circular area 22 of joinder of the edge 16 and the outer wall 18; or by sewing.

However, in the event that it might be desired to use a replaceable sheet material 12, this could be accomplished by providing a peelable covered strip 24 having an adhesive 26 along the outer side 16' of the edge 16. When the cover 24' is peeled from the adhesive 26; and the outer side 16' of the edge 16 is pressed against the outer wall 18, the edge 16 will be held, at least temporarily, against the outer wall 18 of the material 12. With a proper adhesive, the edge 16 of the mouth 14 may be peeled away from the outer wall 18. By enabling the crushable material 12 to be so removed from the loop 10 and replaced by clean material, the utility of the bowl 8 may be greatly enhanced. Where the crushable material 12 is not removable, when the bowl of the invention has become soiled through contact with canned dog food or other substance which will adhere to the inside of the bowl, either the bowl must be scoured, or the entire bowl and loop thrown away. In such a case, an entire new bowl 8 must be available for use. This may be preferred if the bowl 8 comprising the loop 10 and sheet material 12 can be made very inexpensively.

However, if the material 12 is removable from the loop 10 through use of a peelable adhesive 26 joining the edge 16 of the mouth 14 and the wall 18, it may be only necessary to remove the soiled material 12 and replace it over the loop 10 with a fresh clean material 12. It is well known that once machinery is set up to form plastics into a preselected shape, such as shopping bags, the cost of the resulting item is miniscule. The principal cost of producing bowl 8 of the present invention lies in the flexible loop 10 which may be made of some metal, such as spring-type steel, or a plastic, such as polystyrene.

In use, the flexible loop 10 and the crushable sheet material 12 which is initially provided for the loop 10 in the manner heretofore described, is first twisted into the configuration as shown in FIG. 3, and finally into the reduced size and form 27 shown in FIG. 4. As may be seen, when thus twisted, the unit occupies a minimum of space such that, for certain sized loops, it could actually be placed in a pocket (not shown), or in the glove compartment of a vehicle (also not shown). Preferably, however, the twisted bowl 27 could be inserted in a pouch 30 of the type shown in FIG. 4 which may be closed by a VELCRO strip 32, and carried by a strip 34. When it is desired to use the item as a bowl 8 for water or pet food to be made available for a pet which is being transported in a vehicle, the loop 10 is untwisted to result in the formation of the bowl 8 as shown in FIG. 1. After the dog or other pet has drunk the water made available to it in the bowl 8, whatever is left may be dumped or shaken out, and the loop 10 retwisted into the smaller configuration 27 of FIG. 4. As explained above, however, if the bowl 8 should be used for dog food (not shown) or some other substance which adheres to the inside of the crushed material 12, and the latter is removable from the loop 10, such removal may be effected and the loop 10 by itself twisted as in FIG. 4 and stored. When it is desired to set up a new bowl 8, the loop 10 is untwisted and a replacement sheet material 12 may be provided with its edge 16 passed over the loop 10 and adhered to the outer wall 18 of the new material 12.

While the invention may have particular use for travelers with pets, it may also find use among campers and hikers who particularly may desire to consume some type of liquid sustenance such as soup, stew or cereal. Such users would particularly desire to employ the embodiment of the invention in which the flexible sheet may be replaced.

It may be seen, therefore, that the present invention may be produced very inexpensively and have a number of uses.

I claim:

1. A portable collapsible vessel for holding a fluid or other substance, said vessel comprising:

a rigid but flexible closed thin loop of a predetermined configuration and size formed of a material such as metal or plastic;

a flexible impervious sheet, said sheet being formed with a wall having an outside surface, and an inside surface defining a cavity, said wall terminating in an edge area defining the mouth of the cavity, said mouth having the same predetermined configuration as the loop, but said edge area being large enough to be passed through the loop and to be doubled-back over the loop to contact the outside surface of the wall;

said edge area being passed through and over said loop and back into contact with the outside surface of said wall and being secured to said outside wall surface;

and said loop, with the edge area thus secured to the outside wall surface being twistable to dispose a portion of the loop against another portion of the loop, thereby reducing the size of the loop by approximately one half.

2. The portable collapsible vessel as described in claim 1 wherein the edge area of the wall is heat sealed to the outer surface of the wall.

3. The portable collapsible vessel as described in claim 1 wherein the outside surface of the wall along the edge area is provided with an adhesive strip, said strip having a peelable cover which cover, upon being peeled off, exposes the adhesive strip thereby enabling the outside wall edge area to be adhered to the portion of the outside wall of the sheet having the exposed adhesive strip when said outside wall edge area is brought into contact with said adhesive strip after the last said edge area has been passed through the loop and doubled-back to be brought into contact with the outside wall.

4. The portable collapsible vessel as described in claim 1 wherein the configuration of the loop is circular.

5. The portable collapsible vessel as described in claim 1 wherein the impervious flexible sheet is formed of polyethylene.

6. The portable collapsible vessel as described in claim 1 wherein the outside of the edge area is provided with an adhesive strip, said strip having a peelable cover which cover, upon being peeled off, exposes the adhesive strip, thereby enabling the outside of the edge area, when pressed against said outside wall of the sheet material, to be adhered thereto after the edge area has been passed through the loop and doubled back to be brought into contact with the outside wall.

7. The vessel as described in claim 3 wherein the adhered edge area may be pulled away from the outside wall of the sheet material so that the latter may be removed from the loop for replacement.

8. The vessel as described in claim 6 wherein the adhered edge area may be pulled apart from the outside wall of the sheet material so that the latter may be removed from the loop for replacement.

9. In combination with portable collapsible vessel as described in claim 1, a pouch, said pouch defining a volume of the same shape and slightly larger than half the size of the loop when twisted, and said pouch having a mouth through which the twisted loop may be inserted into the pouch, said mouth being temporarily securable in a closed condition to prevent the twisted loop from exiting the pouch until the mouth is unsecured by the user.

* * * * *